F. H. ILSE.
WIND SHIELD CLEANING IMPLEMENT.
APPLICATION FILED OCT. 12, 1915.

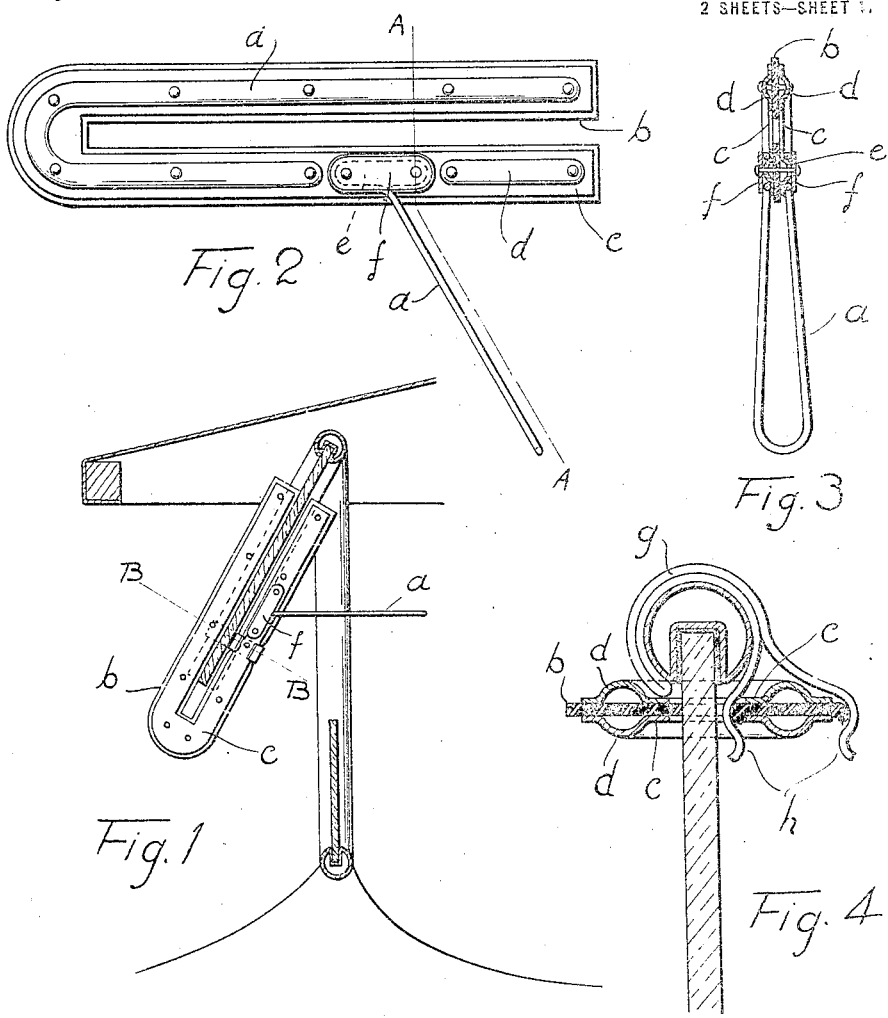
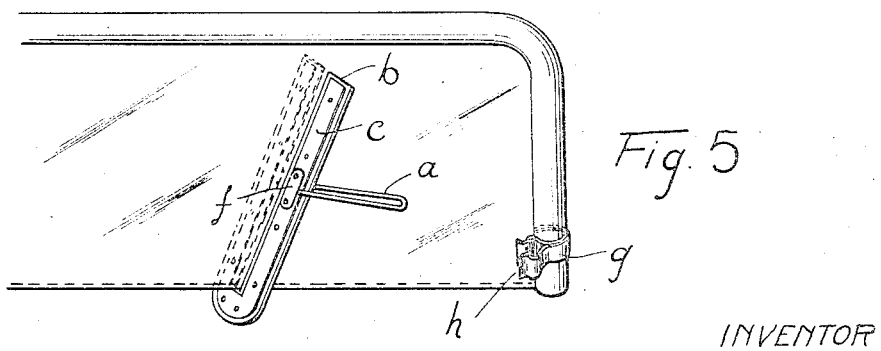

1,251,036.

Patented Dec. 25, 1917.
2 SHEETS—SHEET 2.

INVENTOR
Frank H. Ilse
BY Raymond A. Parker.
ATTORNEY

ID OFFICE.

FRANK H. ILSE, OF DETROIT, MICHIGAN.

WIND-SHIELD-CLEANING IMPLEMENT.

1,251,036.  Specification of Letters Patent.  Patented Dec. 25, 1917.

Application filed October 12, 1915. Serial No. 55,545.

*To all whom it may concern:*

Be it known that I, FRANK H. ILSE, a citizen of the United States, residing at Detroit, county of Wayne, State of Michigan, have invented a certain new and useful Improvement in Wind-Shield-Cleaning Implements, and declare the following to be a full, clear, and exact description of the same, such as will enable others skilled in the art to which it pertains to make and use the same, reference being had to the accompanying drawings, which form a part of this specification.

This invention relates to a windshield cleaning implement designed to be secured to a windshield during inclement weather.

In the drawings,—

Figure 1 is a vertical longitudinal section of the front part of an automobile, showing the tool clamped in position ready for service.

Fig. 2 is an elevation of the tool.

Fig. 3 is a cross section on the line A—A of Fig. 2.

Fig. 4 is a section on the line B—B of Fig. 1.

Fig. 5 is an inside elevation of the upper panel of a windshield showing the tool in operation (the supporting hand not being shown).

Practically all the automobiles made to-day are equipped with what is known as the ventilating rain-vision windshield, that is to say, a windshield which is provided with an upper panel which is pivoted at its sides near the top so as to allow movement of the upper panel as shown in Fig. 1. This is advantageous in not only providing ventilation but it is also advantageous in providing an unobstructed line of vision between the two shields when the upper shield becomes so covered with rain or snow that objects cannot be seen through it. Nevertheless it is desirable to keep this upper shield clean and free from moisture, snow and ice. To accomplish this I provide a tool or squeegee which may be used to frequently wipe the moisture, snow and ice from the upper panel, and may also be used for a like purpose on the lower panel.

One form of the squeegee is shown in Figs. 1–5 and comprises a narrow U-frame supported by a wire handle $a$. The U-frame is made up of a strip of rubber $b$ and a pair of U-strips $c$, the latter of which are provided with corrugations $d$ to strengthen them. The corrugation is interrupted at one place to allow the attachment of the wire handle $a$, the same being provided at its attaching end with two convolutions of wire which run around a small corrugation $e$ on each side of the frame. Plates $f$ can be riveted over the convolutions of wire and the short corrugations $e$ to secure the wire handle to the U-frame.

Figure 6:
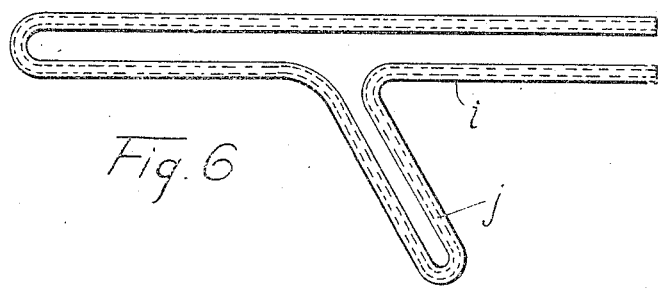
Fig. 6 is a view of a modified form of tool.
Figure 7:
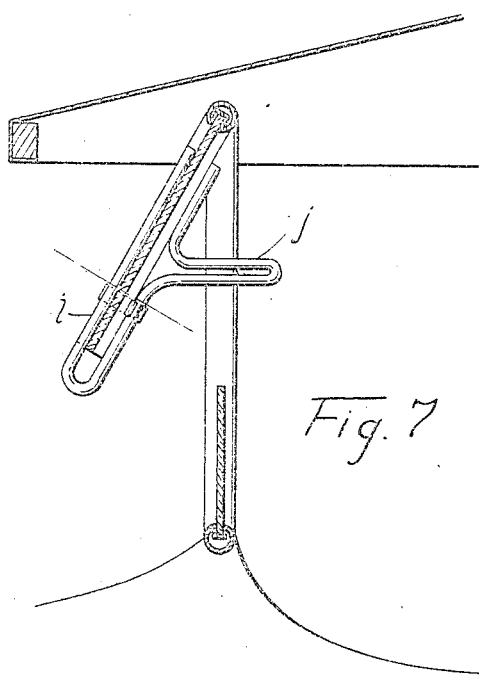
Fig. 7 is a longitudinal section of the front part of an automobile showing this modified form of tool in place on the upper windshield panel.

The rubber strip $b$ protruding on all sides of the U-strips of metal $c$ affords a wiping surface in the well known way of window cleaners. The form of squeegee shown in Figs. 6, 7, 8 and 9 is my preferred form because it is much simpler and cheaper to construct. It comprises a single wire which is first loosely covered with rubber tubing $i$. The wire and the rubber tubing is then bent to the form shown in Fig. 6, which comprises an elongated U with a long loop $j$ projecting from the inside leg of the U in an oblique direction, as shown in Figs. 1 and 7. The obliquity is largely ascertained by tipping the upper windshield panel to the position ordinarily occupied to secure a clear vision ahead during inclement weather. With the wiping portion of the tool tipped to fit over the upper windshield panel, in such position the handle is arranged so as to be substantially horizontal as shown in Fig. 7. The rubber tubing in this form of tool performs the same function as the rubber strips in the form of tool first described. It is preferable to have the tubing loose so that a certain amount of flexibility is given it in the similar way that a flat strip of rubber is flexible.

Figure 8:
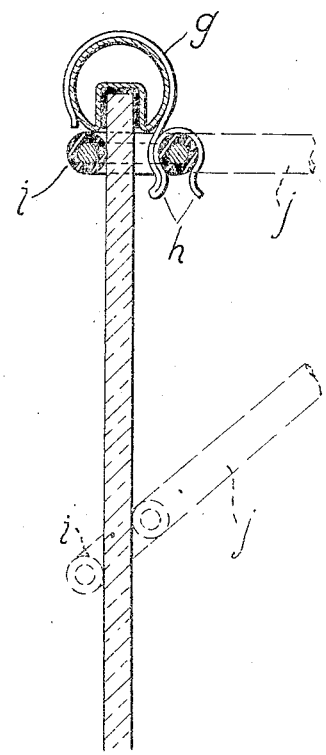
Fig. 8 is a longitudinal section of a part of the upper windshield panel, showing the tool rested in the retaining clip and indicating in dotted lines how the tool is operated.
Figure 9:
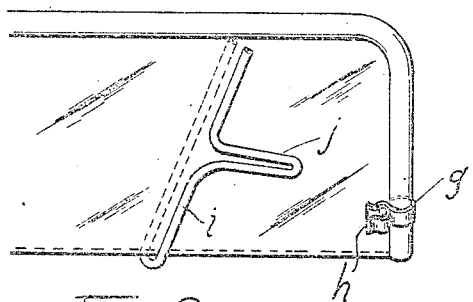
Fig. 9 is an inside view of a portion of the upper windshield panel showing the tool in its course across a glass (the human hand that supports the tool being omitted).

It will be noted that in both forms of tools the elongated U portion is somewhat wider than the glass and that in using the implement the same is tipped in the direction in which it is being drawn as is especially well shown in Fig. 8.

The use of the U-frame not only serves to provide a cleaner for both sides of the glass, but it also serves the important function of guiding the cleaner which might not otherwise be easy, especially when endeavoring to clean the outside of the panel from a position inside.

At the side of the upper windshield panel and upon the molding I insert a spring clip *g* bent as shown in Figs. 4 and 5, so as to encircle the molding and provide a pair of spring lips *h*. The inside leg of the U-frame may be forced between these spring lips so that the tool will be held as shown in Figs. 4 and 8. This consequently holds the tool as shown in Figs. 1, 4 and 8, in a convenient position at the side of the upper windshield panel where it may be grasped with one hand by the operator of the car and while the car is running may be quickly drawn across the panel and back into the clip. Consequently the windshield may be given frequent cleanings without stopping the car by simply grasping the tool and drawing it across the panel and back. With this arrangement the windshield can always be kept free from such moisture, snow and ice as will impair the vision and make driving dangerous.

What I claim is:

1. A windshield cleaning implement, comprising a single piece of wire bent to form an elongated U-frame and at one side looped to form a handle, and rubber tubing covering substantially the entire length of the single piece of wire.

2. A squeegee, comprising a pair of parallel wiper arms spaced a distance slightly greater than the thickness of the pane of glass on which the squeegee is to be used, the said wipers being arranged to be brought into contact with the opposite side of the glass by tilting the squeegee relative to the pane of glass.

3. A squeegee, comprising a yoke-like member having wipers on the inside of its arms, the said arms being spaced a distance slightly greater than the thickness of the glass to which the squeegee is to be applied, and a handle projecting outwardly from one of the yoke arms, the said squeegee being adapted to be operated by tilting the same with respect to the pane of glass, thereby bringing the wiping surfaces in contact with the glass.

In testimony whereof, I sign this specification.

FRANK H. ILSE.